Figure 3:
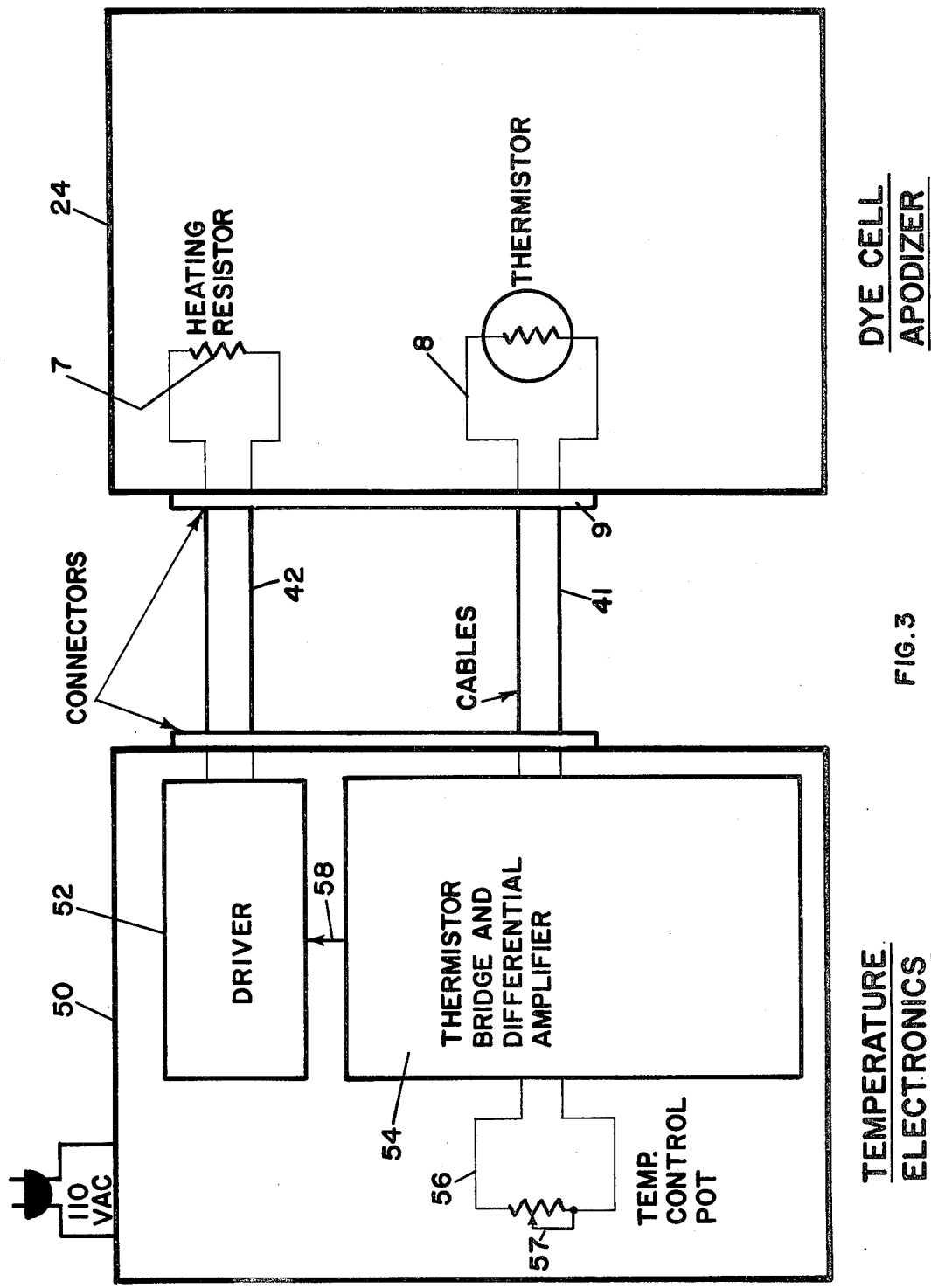

United States Patent [19]

Siebert

[11] 4,043,635
[45] Aug. 23, 1977

[54] TEMPERATURE CONTROL FOR APODIZERS
[75] Inventor: Larry D. Siebert, Ann Arbor, Mich.
[73] Assignee: KMS Fusion, Inc., Ann Arbor, Mich.
[21] Appl. No.: 525,829
[22] Filed: Nov. 21, 1974
[51] Int. Cl.² .............................................. G02F 1/32
[52] U.S. Cl. ................................. 350/160 R; 350/312
[58] Field of Search ................ 350/312, 160 R, 160 P
[56] References Cited
U.S. PATENT DOCUMENTS 3,169,163  2/1965  Nassenstein ...................... 350/160 R
3,704,935  12/1972  Böer .................................. 350/160 R
3,841,731  10/1974  Midwinter ........................ 350/160 R Primary Examiner—Alfred E. Smith
Assistant Examiner—B. C. Anderson
Attorney, Agent, or Firm—Barnes, Kisselle, Raisch & Choate

[57] ABSTRACT

An apparatus for matching the refractive index of the attenuating fluid to the windows in dye cell apodizers and a method for accomplishing the same, which includes an apodizer window and a support therefor together with a heating device associated with the window and a control means for regulating the temperature of the heating device.

6 Claims, 3 Drawing Figures

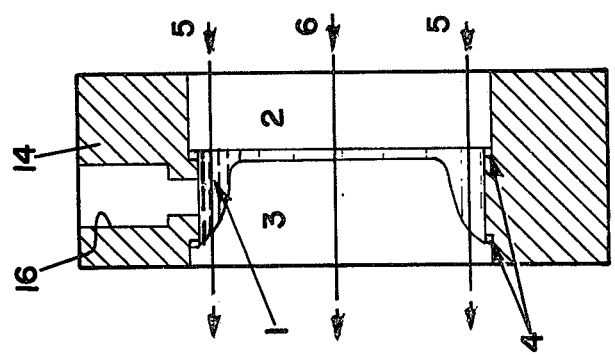
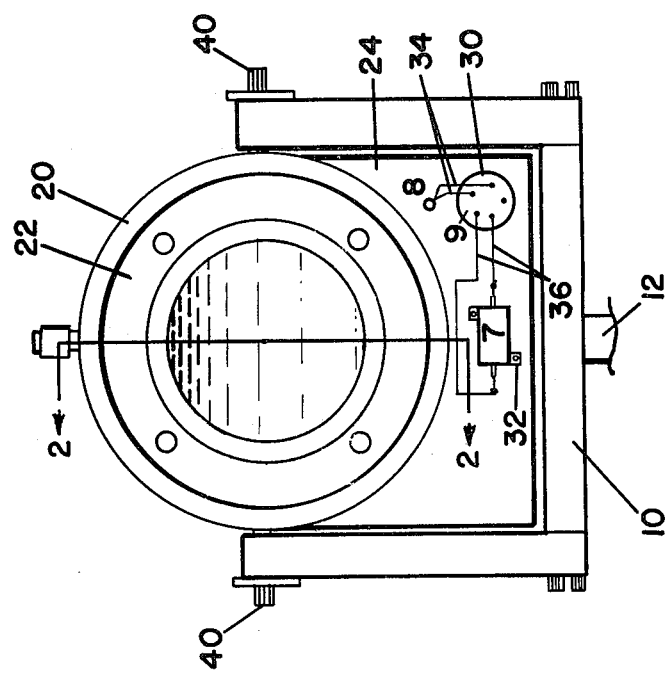

TEMPERATURE CONTROL FOR APODIZERS

This invention relates to a Temperature Control for Apodizers and more particularly to an apparatus for matching the refractive index of the attenuating fluid to the windows in dye cell apodizers and the method for accomplishing the same.

It is desirable in the transmission of a laser beam to achieve uniformity through the beam by retarding diffraction ring formation. In this connection, apodizers have been designed for optical apertures in a laser beam system utilizing various methods of reducing the undesirable diffraction. One such apodizer involves the use of a light absorbing liquid. This is described in copending patent applications of Robert L. Nolen, Jr. and Larry D. Siebert, entitled "High Power Laser Apodizer," Ser. No. 513,340, filed Oct. 9, 1974, and Siebe Jorna, Larry D. Siebert and Keith A. Brueckner, entitled "Aperture Attenuator," Ser. No. 513,341, filed Oct. 9, 1974. While the so-called dye cell, liquid window devices have greatly aided in achieving uniformity, nevertheless, it has been found that the temperature variations can alter the characteristics sufficiently that undesirable diffraction does occur.

It is, therefore, an object of the present invention to provide an apparatus which permits accurate matching of the refractive index of the attenuating fluid in the annular chamber of an apodizer to the more permanent window constructions in what are referred to as dye cell apodizers.

It is an object to provide an apparatus in which exact index match can be achieved by a relatively simple system and to provide a system for controlling temperature-induced index changes.

Other objects and features of the invention will be apparent in the following description and claims in which the principles of operation are set forth together with the best mode presently contemplated for the practice of the invention.

DRAWINGS accompany the disclosure and the various views thereof may be briefly described as:

FIG. 1, a view of the apparatus taken on the optical axis of a system.

FIG. 2, a sectional view on line A—A of FIG. 1.

FIG. 3, a block diagram of the various elements of the system for achieving temperature control.

With reference to the drawings, apodizer fluid 1 is contained in an apodizer cell by the windows 2 and 3 sealed by O-rings 4. The attenuated rays 5 of the laser on axis 6 are shown passing through the fluid 1 at the greatest axial dimension, this fluid being index matched to the index of the glass. A heating resistor 7, a thermistor sensor 8, and a connector 9 are shown on a U-shaped support bracket 10 which is mounted on an optical support rail 12.

The apodizer ring 14 which supports the glass elements 2 and 3 has a liquid opening 16 which can be closed by a suitable plug not shown. The ring 14 is supported in a circular frame 20 and held in place by ring plates 22 on each side. The frame 20 is mounted in a base block 24 suspended in the U-shaped support bracket 10. A recess 30 is provided in the block 24 to receive the thermistor sensor 8 and the heating resistor 7 is bolted to the block by small attachment flanges 32. Suitable connector wires 34, 36 are provided between connector 9 and the thermistor and the heating resistor, respectively. The ring 20, ring plates 22, and the base block 24 are preferably formed of a highly thermal conductive material such as aluminum and the device is preferably operated near room temperature to avoid thermal gradients across the apodizer cell.

The apodizer cell and base block are supported in bracket 10 by screws 40.

In FIG. 3, a block diagram is provided showing the elements of the system. A small box 50 connected to a 110 volt AC circuit contains a current driver 52 suitably connected as by a cable 42 to the heating resistor 7. Also contained in box 50 is a thermistor bridge and differential amplifier unit 54. Unit 54 includes a thermistor bridge having as one arm thereof the thermistor 8 suitably connected to unit 54 by a cable 41. A temperature control potentiometer 56 is connected to an opposed arm of the bridge to provide for calibration thereof and has a wiper arm 57 connected to a suitable mechanical device (not shown) for that purpose. Two opposed corners of the bridge are connected to a suitable source of DC power. Connected across the other corners of the bridge in the usual manner is a differential amplifier having an output 58 connected to current driver 52. Thus, the current applied to resistor 7 by driver 52 is directly proportional to the unbalance of the thermistor bridge and, therefore, to the temperature at thermistor 8.

For a specific application, the apodizer and temperature control unit, therefore, are adjusted as follows. The refractive index of the attenuator fluid 1 is first approximately matched to that of the glass windows 2, 3 at some temperature above room temperature, for example, at 5° C above room temperature. This may be done by adjusting the relative mixture ratios of the components used in fluid 1 which may be, for example, a solution of copper nitrate dissolved in dimethyl sulfoxide and water. As a next step, the fluid is poured into the apodizer as through opening 16. The refractive index of fluid 1 is then "fine tuned" to match that of windows 2 and 3 by adjusting wiper 57 along resistor 56 which unbalances the thermistor bridge and forces the drive current to resistor 7 upwardly or downwardly accordingly. Since the refractive index/temperature gradient of fluid 1 is greater than that of windows 2 and 3, the relative refractive indices of the overall dye cell may be brought into exact match by merely adjusting the temperature thereof upwardly or downwardly a few degrees as required.

Once the exact matching is achieved, the system is ready for operation.

To determine exact index matching, the dye cell apodizer is placed in a collimated CW laser beam of the proper wavelength so the apodizer aperture is flooded with nearly uniform intensity. The intensity distribution of the beam is then monitored at 10 meters or more beyond the dye cell with an infrared (or suitable) viewer. The temperature of the dye cell is slowly increased until rings suddenly appear, then the temperature is decreased slightly until the rings disappear and a smooth intensity pattern results.

I claim:

1. An apparatus for dye cell refractive index matching which comprises:
    a. first means forming an optical aperture and a support therefor, each being formed of material having relatively high thermal conductivity,
    b. optically transparent means supported in said aperture in thermal conductive relationship with and forming an annular cavity adjacent the inner periphery of said first means, c. a liquid within said cavity in thermal conductive relationship with said first means and said transparent means having a characteristic of changing its refractive index with a change of liquid temperature and having a refractive index closely matched to that of said transparent means at a temperature above room temperature, and d. heating mens associated with said support for maintaining the temperature of said apparatus substantially uniform throughout said first means, said optically transparent means and said liquid and at said temperature above room temperature such that the refractive index of said liquid is closely matched to that of said transparent means.

2. In a dye cell apodizer having an attenuating fluid enclosed between a pair of optically transparent windows, the method of matching the fluid refractive index which is a function of fluid temperature to the refractive index of the windows comprising the steps of: preparing the attenuating fluid to have a refractive index which approximates that of the apodizer windows at a temperature above room temperature and to have a refractive index/temperature gradient which is greater than that of the windows, placing the fluid into the apodizer between the windows, and uniformly adjusting the temperature of the apodizer above room temperature until the refractive index of the fluid matches that of the windows.

3. A dye cell apodizer for retarding diffraction ring formation around a laser beam, said apodizer comprising means forming an optical aperture, optically transparent means having a preselected refractive index at a predetermined temperature above ambient and forming an annular cavity adjacent the inner periphery of said aperture forming means, a liquid within said cavity having a refractive index approximately equal to that of said transparent means at said predetermined temperature above ambient and having a refraction index/temperature gradient which is greater than that of said transparent means, and heating means to uniformly adjust the temperature of said aperture forming means, said transparent means and said liquid above ambient temperature such that the refractive index of said liquid is closely matched to that of said transparent means.

4. The apodizer set forth in claim 3 wherein said heating means comprises first means in thermal conductive relation with said aperture forming means and having an electrical impedance which varies as a function of the temperature of said aperture forming means, adjustable impedance means, and means operatively coupled to said adjustable impedance means and to said first means to uniformly change the temperature of said aperture forming means, said transparent means and said liquid as a function of the difference between the impedances of said adjustable impedance means and said first means.

5. The apodizer set forth in claim 4 wherein said temperature changing means comprises second electrical impedance means carried in heat-transfer relationship with said aperture forming means, and means applying an electrical current to said second electrical impedance means as a function of the difference between the impedances of said adjustable impedance means and said first means.

6. The apodizer set forth in claim 5 wherein said first means comprises a thermistor carried by said aperture forming means in heat-transfer relationship therewith, and wherein said second electrical impedance means comprises a resistor mounted on said aperture forming means.

* * * * *